United States Patent
Hernandez Botella et al.

(10) Patent No.: US 10,483,852 B2
(45) Date of Patent: Nov. 19, 2019

(54) CONTROL METHOD FOR CONTROLLING A POWER CONVERTER CIRCUIT AND RESPECTIVE POWER CONVERTER CIRCUIT

(71) Applicant: GRUNDFOS HOLDING A/S, Bjerringbro (DK)

(72) Inventors: Juan Carlos Hernandez Botella, Kgs. Lyngby (DK); Lars Press Petersen, Virum (DK)

(73) Assignee: GRUNFOS HOLDING A/S, Bjerringbro (DK)

(*) Notice: Subject to any disclaimer, the term of this patent is extended or adjusted under 35 U.S.C. 154(b) by 0 days.

(21) Appl. No.: 16/083,232

(22) PCT Filed: Mar. 8, 2017

(86) PCT No.: PCT/EP2017/055410
§ 371 (c)(1),
(2) Date: Sep. 7, 2018

(87) PCT Pub. No.: WO2017/153454
PCT Pub. Date: Sep. 14, 2017

(65) Prior Publication Data
US 2019/0074773 A1    Mar. 7, 2019

(30) Foreign Application Priority Data
Mar. 9, 2016   (EP) ..................................... 16159368

(51) Int. Cl.
*H02M 3/158* (2006.01)
*H02M 1/00* (2006.01)

(52) U.S. Cl.
CPC .. *H02M 3/1588* (2013.01); *H02M 2001/0009* (2013.01); *H02M 2001/0058* (2013.01);
(Continued)

(58) Field of Classification Search
CPC ....... H02M 3/156–158; H02M 3/1584; H02M 3/1588; H02M 2001/0009;
(Continued)

(56) References Cited

U.S. PATENT DOCUMENTS

| | | | |
|---|---|---|---|
| 4,599,553 A * | 7/1986 | Brennen | H02J 3/1842 323/205 |
| 2008/0164859 A1* | 7/2008 | Peng | H02M 3/157 323/318 |

(Continued)

FOREIGN PATENT DOCUMENTS

| | | |
|---|---|---|
| DE | 10 2015 101 673 A1 | 8/2015 |
| EP | 0 687 057 A1 | 12/1995 |

*Primary Examiner* — Yemane Mehari
(74) *Attorney, Agent, or Firm* — McGlew and Tuttle, P.C.

(57) ABSTRACT

A control method controls a power converter circuit. The power converter circuit includes at least one inductive element (L) storing an output energy, a charging switch (C) for charging the inductive element (L), a releasing switch (R) for releasing the stored output energy from the inductive element (L) and for charging the inductive element (L) with a compensation energy and an output capacitor ($C_{out}$) saving the released output energy. The compensation energy is used to achieve Minimized Voltage Switching (MVS) condition when switching on the charging switch (C). A turn on time ($t_e$, $t_{dis}$) of the releasing switch is adjusted by a closed-loop control of a compensation control variable ($V_{aux}$) measured in the power converter circuit or of a characteristic value ($V_{sample}$) derived from this compensation control variable ($V_{aux}$), and a respective power converter circuit.

20 Claims, 4 Drawing Sheets

(52) U.S. Cl.
CPC .. *H02M 2001/0064* (2013.01); *Y02B 70/1466* (2013.01); *Y02B 70/1491* (2013.01)

(58) Field of Classification Search
CPC .... H02M 2001/0064; G05F 1/56; G05F 1/70; G05F 1/565; G05F 1/575; Y02E 40/12; Y02E 40/30; Y02B 70/126
USPC ....... 323/205, 271, 272, 282, 284–286, 290, 323/318
See application file for complete search history.

(56) References Cited

U.S. PATENT DOCUMENTS

| | | | |
|---|---|---|---|
| 2013/0093403 A1* | 4/2013 | Jia | H02M 3/1588 323/272 |
| 2014/0312868 A1 | 10/2014 | Dally | |
| 2016/0276924 A1* | 9/2016 | Castelli | H02M 1/42 |

* cited by examiner

CONTROL METHOD FOR CONTROLLING A POWER CONVERTER CIRCUIT AND RESPECTIVE POWER CONVERTER CIRCUIT

CROSS REFERENCE TO RELATED APPLICATIONS

This application is a United States National Phase Application of International Application PCT/EP2017/055410, filed Mar. 8, 2017, and claims the benefit of priority under 35 U.S.C. § 119 of European Application 16 159 368.6, filed Mar. 9, 2016, the entire contents of which are incorporated herein by reference.

TECHNICAL FIELD

The invention refers to control method for controlling a power converter circuit and to a respective power converter circuit implementing the method.

BACKGROUND

In power converter circuits like boost or buck converter circuits it is common practice to use a valley-switching method or a zero voltage switching method to reduce switching losses in the circuit. Furthermore, it is known to use an extended zero voltage switching operation according to which a conduction time of a rectifier in the circuit is extended beyond zero current condition in the inductor to compensate the parasitic capacitance of the switches. This can be achieved by an extended conduction time of the synchronous rectifier switch in the circuit. However, there are still remaining switching losses which cannot be fully avoided. These problems in particular occur in high voltage power converters.

SUMMARY OF THE INVENTION

In view of this it is an object of the invention to improve a control method for controlling a power converter circuit and a respective power converter circuit such that switching losses are further reduced.

The control method according to the invention is designed for controlling a power converter circuit, having a synchronous rectifier. This control method is in particular designed to operate a high voltage power converter having breakdown voltages of the used switching devices above 200 volt and in particular above 300 volt. Furthermore, the method may preferably be used to operate a high voltage power converter with a high switching frequency above 300 kHz and preferably in a range of 500 to 2000 kHz. The power converter circuit to be controlled by the control method according to the invention comprises at least one inductive element which is provided for storing an output energy and a charging switch for charging the inductive element. Furthermore, the power converter circuit comprises a releasing or rectifier switch for releasing the stored output energy from the inductive element and for charging the inductive element with a compensation energy. Furthermore, the circuit comprises an output capacitor saving the released output energy. The compensation energy is used to achieve minimized voltage switching conditions (MVS-Conditions), when switching on the charging switch. By switching on the charging switch at a minimum voltage across the switch the switching losses are reduced.

According to the invention by an extended turn on time of the releasing switch a compensation energy is transferred to the inductive element compensating the energy charged in a parasitic capacitor represented at a switching node of the power converter. The switching node is defined as the node where the inductive element and the charging switch are connected. According to the invention the turn on time of the releasing switch is adjusted by closed-loop control of a compensation control variable which is measured in the power converter circuit. Alternatively a characteristic value derived from this compensation control variable which is measured in the circuit can be closed-loop controlled to adjust a turn on time of the releasing switch. By such closed-loop control on basis of a variable measured in the circuit or a value derived from such measured variable it becomes possible to further minimize the voltage when turning on the charging switch. This means it is possible to minimize the minimum of the minimized voltage switching condition by this closed-loop control. The closed-loop control allows to react on changes in the power converter circuit, for example variations in propagation delay times in the circuit. Furthermore, variations of the components caused by changing temperature or for example aging as well as tolerances can be compensated by such closed-loop control. By such closed-loop control the voltage across the charging or main switch can be reduced to a minimum closer to zero, in particular to zero at the instant of turning on the charging switch. By this the minimum voltage switching conditions are further improved compared to known curve fitting or look up table method for the extended rectifier conduction time.

According to a preferred embodiment the compensation energy stored in the inductive element has a reversed sign compared to the output energy stored in the inductive element. This means after releasing the stored output energy from the inductive element to the output capacitor it is possible to carry out a reverse charging of the inductive element via the releasing rectifier switch during the extended switch-on time. This reverse charge can compensate the energy stored in the parasitic capacitance at the switching node. This parasitic capacitance is the resulting parasitic capacitance of all parasitic capacitances in the circuit.

Preferably the closed loop control adjusts the turn on time of the releasing switch to aim the compensation control variable or the derived characteristic value to reach a predefined value, in particular zero. This means a reference value of the compensation control variable is predefined. Preferably this reference value is zero. The closed loop control is carried out to keep the actual compensation control variable at or close to the reference value.

In a further preferred embodiments a PI-regulator (Proportional-Integral regulator) is used in the closed loop control. This means preferably a difference between the measured compensation control variable and the predefined reference value for the compensation control variable is feed to a PI-regulator generating an actuating variable used for adjusting the turn on time of the releasing switch.

It is further preferred that the charging switch and/or the releasing switch are each turned on when a respective turn on variable reaches a predefined value and in particular reaches zero. This means the charging switch preferably is switched on when a charging switch turn on variable reaches a predefined value, in particular zero. In addition or alternatively the releasing switch preferably is turned on when a releasing switch turn on variable reaches a predefined value and in particular zero. By this zero voltage switching conditions or minimized voltage switching conditions are achieved.

Preferably said turn on variable, I. e. the charging switch turn on variable and/or the releasing switch turn on variable is a differential voltage across the respective switch or a time derivative of this differential voltage across the switch. To determine the minimum of this differential voltage preferably a time derivative of this differential voltage is used. When the derivative of the voltage become zero the minimum of the differential voltage is reached.

As a compensation control variable preferably a voltage in the power converter circuit or variable representing such voltage or derived from such voltage is used. In particular the compensation control variable may be a differential voltage across the charging switch or a variable representing such voltage or derived from such voltage. Preferably it is the intention of the invention to minimize the differential voltage across the charging switch at the moment when switching on the charging switch. This means by controlling the compensation control variable in a closed-loop control to minimize this variable it is possible to minimize the voltage across the switch at the minimum or valley of the voltage curve considered for minimize voltage condition. By this it is possible to further reduce switching losses occurring in the charging switch.

Instead of using the differential voltage across the charging switch itself as a compensation control variable in a special embodiment it is possible to use a derived value or a variable representing such voltage. In particular this may be a variable detected or measured in the power converter circuit which is proportional to the differential voltage across the charging switch. This means it is not the differential voltage across the charging switch itself measured in the system but a variable or value representing this voltage, in particular a proportional variable. This variable or voltage may be measured directly or indirectly in the circuit.

Preferably the compensation control variable is derived on basis of a differential voltage detected across an auxiliary winding in the power converter circuit, in particular across an auxiliary winding which is magnetically coupled to a winding forming said inductive element in the power converter circuit. By this an indirect measurement of the differential voltage across the charging switch or a variable representing this differential voltage across the charging switch, is achieved. The compensation control variable may be derived from the differential voltage detected across the auxiliary winding by scaling down said detected differential voltage considering the input voltage of the power converter circuit.

Using a derived compensation control variable instead of directly using the differential voltage across the charging switch is advantageous in particular in a high voltage power converter circuit operated at a high switching frequency as explained above, for example a power converter circuit having breakdown voltages above 300 volt and switching frequencies above 500 kHz. In such high voltage power converter circuits operated with a high switching frequency high resistive voltage divider would be required to directly measure the input and the node voltage or a differential voltage across the switch. With a normal input capacitance of a measurement component this would result in a high phase delay of the measured voltage which could not be used when operating the switches at a high switching frequency as described above. By using a derived control variable, in particular by using a differential voltage detective across an auxiliary winding such high resistive voltage divider could be avoided which allows to operate the control method with a minimum of phase delay of the measured signals.

According to a further preferred embodiment of the control method the compensation control variable is measured and stored at a certain point in time. In particular this point in time is the moment or instant when the charging switch is turned on. The closed-loop control for adjusting the turn on time of the releasing switch, then, is carried out on basis of the stored compensation variable. By storing the measured compensation control variable or the compensation control variable derived from a measured value in the system at a predefined moment in time it becomes possible to carry out the closed-loop control on basis of a compensation control variable representing the differential voltage across the charging switch at the moment when switching on the charging switch. This is important, since it is the differential voltage across the charging switch at this moment which should be minimized according to the invention.

With the method according to the invention the closed-loop control can adjust the additional turn on time of the releasing switch in a proportional relationship to the difference between the measured and sampled node or differential voltage on one side and the wanted node or differential voltage on the other side. Preferably the turn on time is PI controlled.

The turn on time of the releasing switch consists of a first time period from turning on the releasing switch until the current in the switch becomes zero and a second time period which is an extended time period and adjusted by said closed-loop control. This means actually the closed-loop control adjusts the second extended time period which is used for charging the inductive element in reverse direction after the energy from the inductive element has been released or transferred to the output capacitor. By this the amount of energy charged to the inductive element in reverse direction which is used for compensating the energy in the parasitic capacitance of the switching node is adjusted to minimize the differential voltage across the charging switch in minimized voltage switching condition. The moment in which the current in the releasing switch becomes zero is the moment at which the energy from the inductive element has been discharged to the output capacitor and at which the reverse charging of the inductive element for the extended second time period starts.

For compensating a propagation delay when turning off the releasing switch preferably a phase-locked loop (PLL) compensation method is used to reduce a conduction loss in the switch. In the same way a method for compensation of propagation delay when turning on the charging switch may be used for reducing the switching loss in the charging switch. Also for this a phase-locked loop compensation method may be used.

Advantageously the turn on time of the charging switch is controlled and in particular closed-loop controlled to achieve a predefined output voltage of the output capacitor in the power converter circuit. By this control a predefined output voltage of the power converter circuit is insured.

Beside the described control method for a power converter circuit also a respective power converter circuit is subject of the present invention. Preferably the power converter circuit is configured to carry out a control method or implementing a control method according the foregoing description.

The power converter circuit according to the invention comprises at least one inductive element configured for storing an output energy. In the power converter circuit there is arranged a main or charging switch which is configured for charging the inductive element. This means when the charging switch is turned on the inductive element is charged with energy. Furthermore, the power converter circuit comprises a rectifier or releasing switch which is arranged and configured for releasing the stored output energy from the inductive element and for charging the inductive element witch a compensation energy. This means when the releasing switch is turned on the energy is discharged or released from the inductive element. At the moment when the energy is released from the inductive element charging or reverse charging with compensation energy starts. Therefore, by extending the switch on time in excess of the discharging of the inductive element a charging of the inductive element with the compensation energy is achieved. In addition an output capacitor is arranged in the power converter circuit which is configured and arranged for saving the released output energy. Thus the energy released from the inductive element is transferred to the output capacitor, I. e. the output capacitor is charged by the output energy released from the inductive element. The power converter comprises control means which are controlling the charging switch and the releasing switch, in particular turning on and off the charging and the releasing switch. By this the charging and releasing of the inductive element and the charging of the output capacitor is controlled by the control means.

Preferably the power converter circuit according to the invention is a high voltage power converter circuit configured for break-down voltages of the switching devices or switches, respectively, lying above 200 volt and more preferably above 300 volt. Furthermore, the power converter circuit preferably is configured to be operated with a high switching frequency above 300 kHz and preferably in a range of 500 to 2000 kHz.

In addition according to the invention the power converter circuit comprises measuring means which are configured such that they measure a compensation control variable in said power converter circuit. This may be a direct or indirect measurement. Furthermore, said control means comprises a closed-loop controller which is controlling the compensation control variable or a characteristic value derived from this compensation control variable to adjust the turn on time of the releasing switch. As explained above by adjustment of the turn on time of the releasing switch the amount of energy which is charged as a compensation energy to the inductive element can be adjusted to minimize the switching or differential voltage across the charging switch in the power converter circuit. By this switching losses in the charging switch are minimized.

Preferably the power converter circuit is configured as a boost converter or a buck converter. In both embodiments the closed-loop control according to the foregoing description can be implemented.

According to a preferred embodiment of the invention the measuring means comprises an auxiliary winding and the measuring means is configured to measure a differential voltage across this auxiliary winding and the control means with a closed-loop controller are configured to carry out the closed-loop control to adjust the turn on time of the releasing switch on basis of the measured differential voltage across said auxiliary winding or on basis of a characteristic value derived from this differential voltage. This means the differential voltage or the characteristic value derived from this differential voltage constitute the compensation control variable as described above.

According to further prepared embodiment said auxiliary winding is magnetically coupled to a winding of said inductive element or inductor, respectively. This magnetically coupling of the winding results in a differential voltage across the auxiliary winding which is proportional to the voltage across the winding of the inductor. Thus indirect measurement of a voltage, namely the voltage across the inductor winding in the power converter circuit is carried out by use of this auxiliary winding. The measuring means and/or the control means may comprise calculating means for scaling down the measured auxiliary voltage on basis of the coupling recue between the inductor winding and the auxiliary winding. The differential voltage across the charging switch can be derived from the measured auxiliary voltage. When having a boost converter the differential voltage across the charging switch can be calculated as the auxiliary voltage subtracted a corresponding scaled input voltage. When having a buck converter the differential voltage across the charging switch can be calculated as the auxiliary voltage subtracted a corresponding scaled output voltage and adding a corresponding scaled input voltage.

As explained above the use of an auxiliary winding and using a differential voltage across this auxiliary winding to carry out the closed-loop control for adjusting the turn on time of the releasing switch is particularly advantageous if the power converter circuit is a high voltage power converter circuit operated at a high switching frequency, in particular above 500 kHz. The use of the differential voltage across the auxiliary winding allows an operation with a minimized phase delay of the measured signals which is important for use with such high frequencies.

In a further prepared embodiment the control means or control device comprise storage means for storing the differential voltage measured across the auxiliary winding or the characteristic value derived from said differential voltage, said storage means preferably comprising at least one capacitor. The characteristic value derived from the measured differential voltage across the auxiliary winding may be a characteristic value representing or corresponding to the differential voltage across the charging switch as described before. This characteristic value can be stored in the storage means. In particular the control means is configured such that the characteristic value or the measured differential voltage are stored in the storage means at a predefined moment in time, in particular the instant when turning on the charging switch as explained before. This allows to carry out the described closed-loop control on basis of a value representing the differential voltage across the charging switch in the moment when the charging switch is turn on.

For this the output of said storage means preferably is connected to an input of said closed-loop controller. Thus the stored voltage or value can be closed-loop controlled in the controller.

As described above the closed-loop controller preferably comprises a PI-regulator.

Further preferred embodiments of the power converter circuit according to the invention may be derived from the aforegoing description of the control method. Therefore, for further preferred embodiments of the power converter circuit it is referred also to the aforegoing description of the control method. The switching element should be a bidirectional switch e.g. the switch should be able to conduct current in both directions when turned on and block in one direction when turned off. The bidirectional switch could be a silicon MOSFET or a silicon carbide MOSFET, or the bidirectional switch can be a III-N device like a III-N HEMT. The term III-N material device etc. refers to a material device or structure comprising a compound semiconductor material according to the stoichiometric formula AlXInyGaZN, where x+y+z is about 1. In a III-N or III-Nidride device a conductive channel can be partly or entirely contained within a III-N material layer.

In the following preferred embodiments of the invention are described with reference to the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
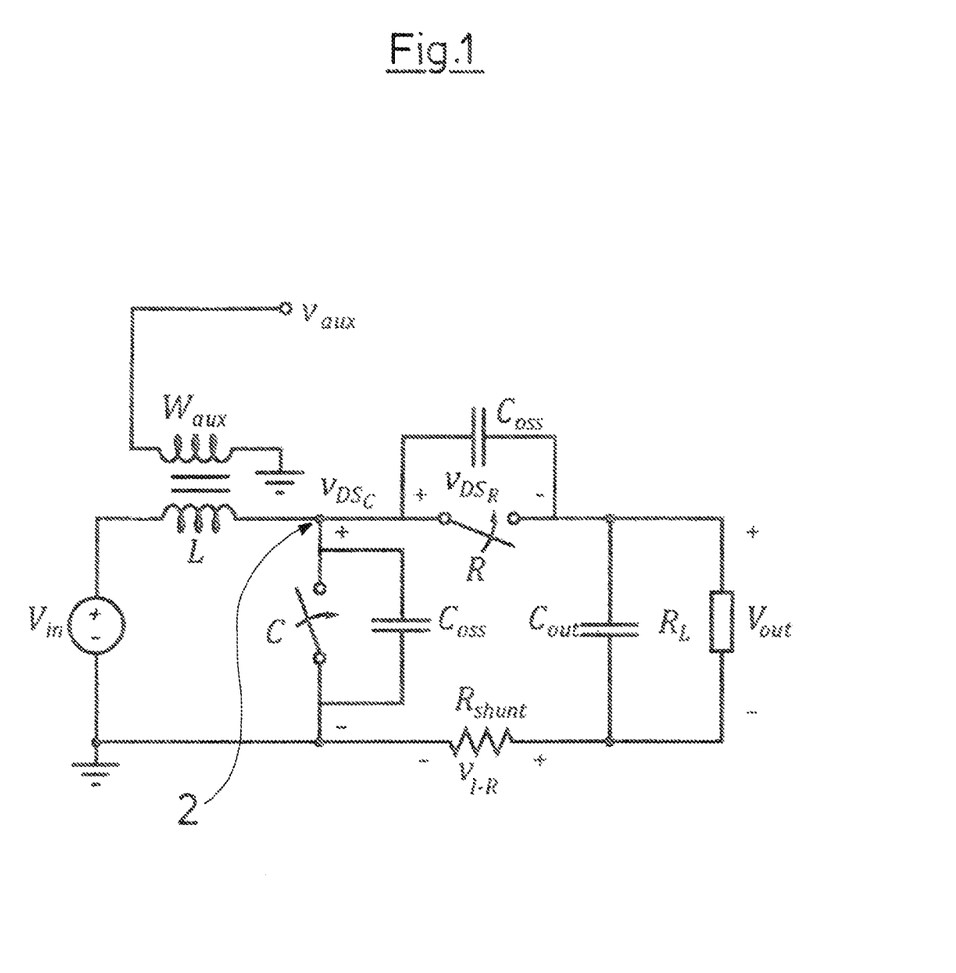
FIG. 1 is a schematic view showing a power converter circuit according to a first embodiment of the invention.

Referring to the drawings, FIG. 1 shows a first example for a power converter circuit in form of a boost converter. The important parts of the circuit are a main or charging switch C and a releasing or rectifier switch R. Furthermore the circuit comprises an inductive element L and an output capacitor $C_{out}$. On the entrance side of the power converter circuit there is an input voltage $V_{in}$ provided by any suitable voltage or power supply. On the output side the power converter provides an output voltage $V_{out}$. Furthermore on the output side the power converter circuit is connected to any suitable output load represented by the load resistor $R_L$ in the circuit shown in FIG. 1. The two switches C and R have a parasitic capacitance $C_{OSS}$ Furthermore in the circuit there is arranged a shunt resistor $R_{shunt}$.

According to the invention there is provided an auxiliary winding $W_{aux}$ which is magnetically coupled to the winding of the inductive element L. The auxiliary winding $W_{aux}$ acts as a measuring means for measuring a compensation control variable as explained below.

Figure 2:
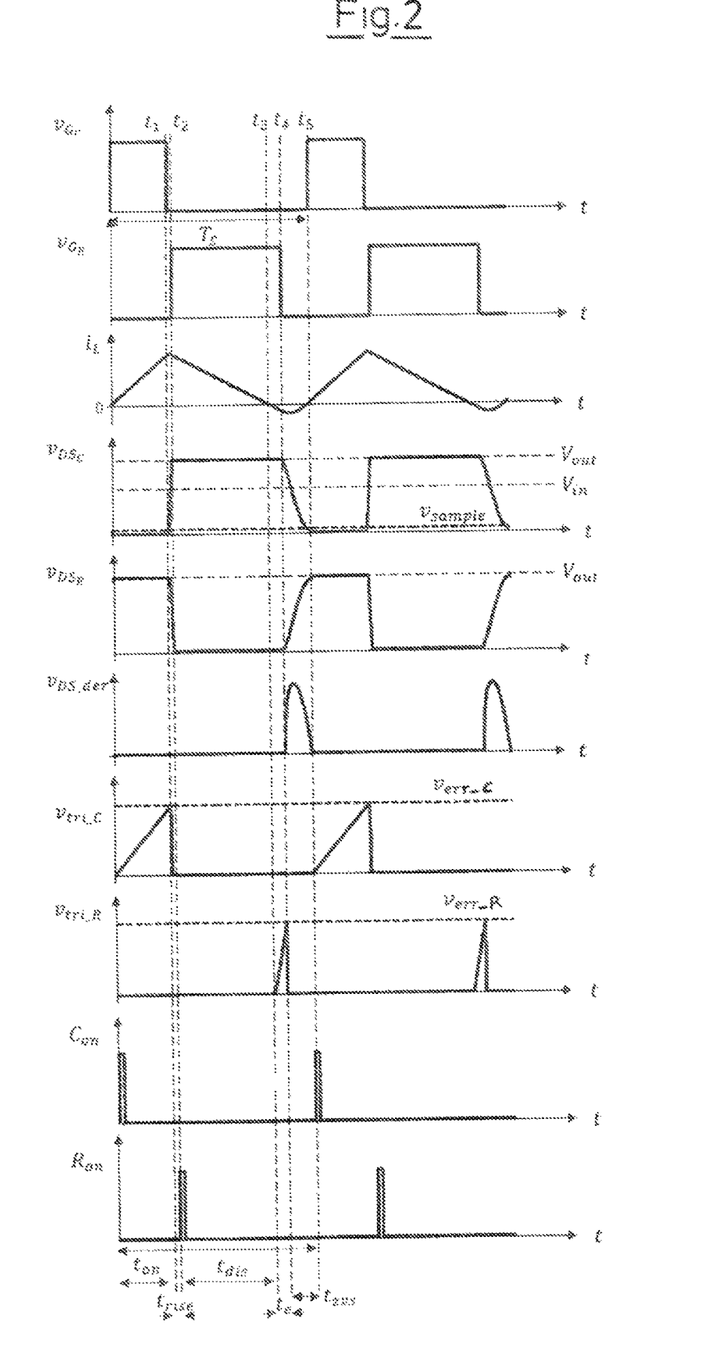
FIG. 2 is a view of ten diagrams with the relevant values in the power converter circuit according to FIG. 1 plotted over time.

According to the invention the main switch C and the releasing switch R are controlled in a way that minimized voltage switching (MVS) conditions are reached when turning on the respective switch. By this the switching loss is reduced. The way how the power converter circuit shown in FIG. 1 is controlled is explained with reference to the diagrams shown in FIG. 2. For charging the inductive element L with energy from the input voltage $V_{in}$ in a first step the charging switch C is turned on. This is done in an instant at which the node voltage $V_{DSC}$ reaches a minimum shown as the rising edge of the signal in FIG. 2. The node voltage is the voltage at the node 2 at which the two branches of the circuit containing the main switch C and the releasing switch R are connected. In this example the node voltage $V_{DSC}$ corresponds to the voltage across the main switch C. The first graph in FIG. 2 represents the status of the main switch plotted over time t. When the signal $V_{GC}$ is zero the charging switch C is turned off, in the period of time where the signal $V_{GC}$ is above zero the switch is turned on. The second graph in FIG. 2 shows a corresponding diagram for the releasing switch R. When the signal $V_{GR}$ is zero the releasing switch is turned off When the signal $V_{GR}$ is above zero the releasing switch is turned on. The third graph in FIG. 2 shows the current $i_L$ in the inductive element L plotted over time. The fourth graph shows the node voltage $V_{DSC}$ plotted over time t. The fifth diagram shows the voltage $V_{DSR}$ across the releasing switch R plotted over time. The sixth graph in FIG. 2 shows a time derivative $V_{DS\_der}$ of the node voltage $V_{DSC}$ plotted over time t.

It can be seen in the first diagram according to FIG. 2 that at the point in time t, the charging switch C is switched off As explained below in more detail the instant for turning off the charging switch is controlled on basis of the output voltage $V_{out}$. When the charging switch C is turned off at the point in time t, the node voltage $V_{DSC}$ rises in the time period $t_{rise}$ until the point in time $t_2$. At this point in time when the node voltage reaches the output voltage $V_{out}$ the releasing switch R is turned on as can be shown in the second graph of FIG. 2. When the releasing switch R is turned on the energy stored in the inductive element L is discharged to the output capacitor $C_{out}$. When the energy stored in the inductive element L is completely discharged to the output capacitor $C_{out}$ the current $i_L$ in the circuit becomes zero at the point $t_3$ as shown in the third graph in FIG. 2. This is detected by use of the shunt resistor $R_{shunt}$ by measuring the voltage $V_{I-R}$ across the shunt resistor $R_{shunt}$.

Figure 3:
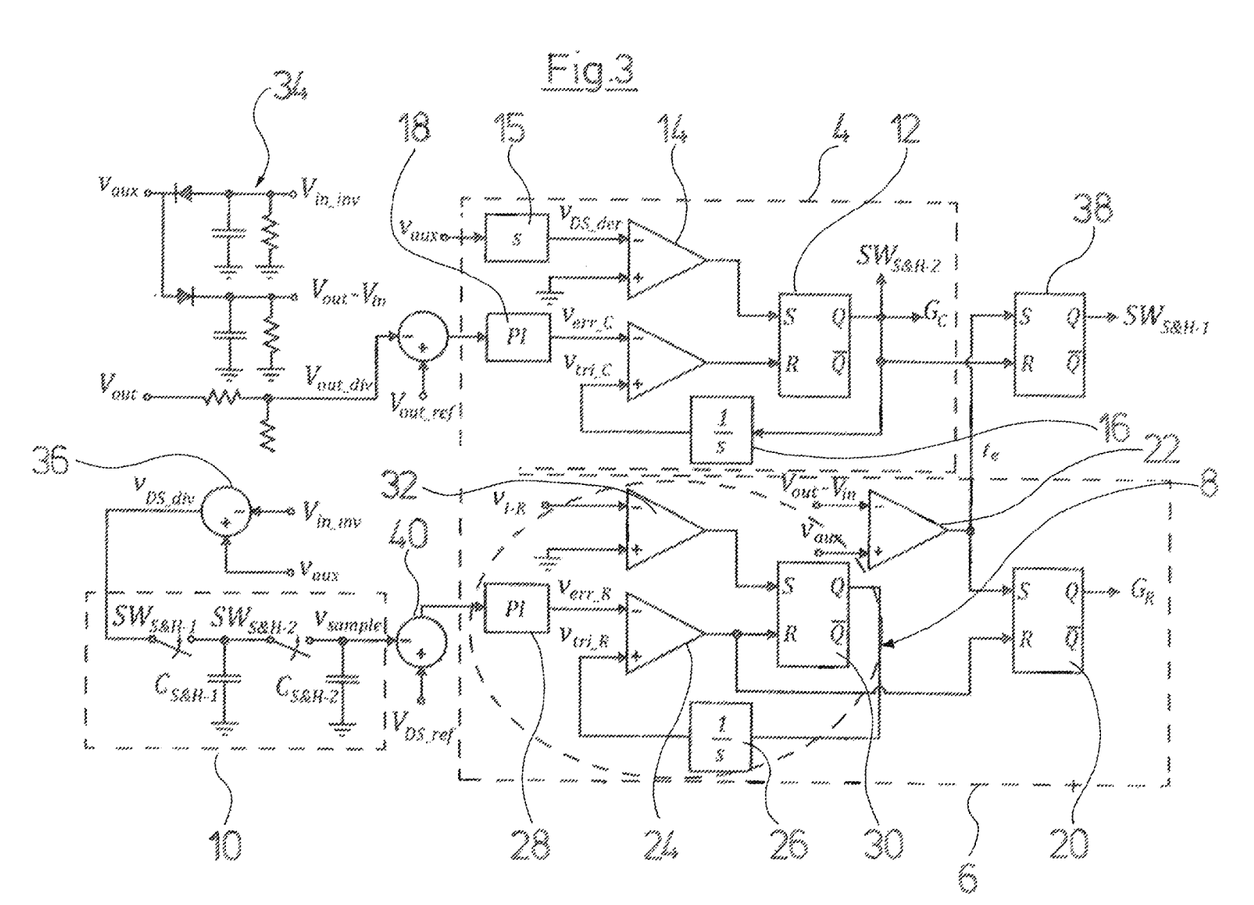
FIG. 3 is a schematic view of a control device for the power converter circuit according FIG. 1.

At the point in time $t_3$ an extended turn on time $t_e$ of the releasing switch R starts. This extended turn on time $t_e$ ends at the point in time $t_4$. The extended turn on time $t_e$ according to the invention is closed loop controlled by a control device as shown in FIG. 3 and explained below. For this trigger signal $V_{tri\_R}$ is used. When the trigger signal $V_{tri\_R}$ reaches a predefined error signal $V_{err\_R}$ the releasing switch R is turned off by a controller as explained below. This means the switch on time of the releasing switch R consists of a first time period between point $t_2$ and point $t_3$ and an extended time period $t_e$ between point $t_3$ and point $t_4$. As can be seen in the third graph in FIG. 2 during the extended time period $t_e$ the current $i_L$ becomes negative. This means that the inductive element L is charged in reverse direction during the period $t_e$. Thus the energy stored in the inductive element L during this extended time period $t_e$ has a reversed sign compared to the output energy stored in the inductive element during the time period $t_{on}$ until the charging switch C has turned off. This energy stored in the extended time period $t_e$ is a compensation energy used to compensate the energy stored in the parasitic capacitance at the node 2 of the charging switch to achieve minimum or zero voltage switching conditions when turning on the charging switch C.

In the next step the charging switch C should be turned on again. To achieve a minimized voltage switching condition the time derivative of the node voltage $V_{DS\_der}$ is considered. When the time derivative $V_{DS\_der}$ of the node voltage $V_{DSC}$ becomes zero the node voltage $V_{DSC}$ has reached its minimum, as can be seen in the fourth and sixth graph in FIG. 2. When the time derivative $V_{DS\_der}$ of the node voltage $V_{DSC}$ becomes zero the charging switch C is turned on as can be seen in the first graph in FIG. 2. This takes place at the point in time $t_5$. The last graph and the second to last graph shown in FIG. 2 show the turn on instant signals $R_{on}$ and $C_{on}$ when detecting minimum switching condition for the releasing switch R and the charging switch C plotted over time t.

According to the invention a closed loop control is used to control the extended time period $t_e$ for reverse charging of the inductive element L. By this the node voltage $V_{DSC}$ at the point in time $t_5$ when turning on the charging switch C can be minimized. To carry out this control it is necessary to consider the node voltage $V_{DSC}$. The node voltage $V_{DSC}$ is not directly measured in the power converter circuit. Instead an auxiliary winding $W_{aux}$ is used as a measuring means to detect an auxiliary voltage $V_{aux}$ which acts as a compensation control variable for controlling the turn on time of the releasing switch. The auxiliary voltage $V_{aux}$ is used to recalculate the node voltage $V_{DSC}$ in the controller or control circuit as explained with reference to FIG. 3.

FIG. 3 schematically shows the control device for controlling the power converter circuit as explained before. The control device as shown in the FIG. 3 has four main control blocks, namely a first control block 4 controlling the turning on and off of the charging switch C, a second control block 6 controlling the releasing switch R, a third control block 8 controlling the extended time period $t_e$ explained before and a fourth control block 10 forming a sampling block for providing a sampled voltage $V_{sample}$ on basis of which the control of the releasing switch R and the extended time period $t_e$ is carried out.

In the first control block 4 the turning on and off of the charging switch C is carried out by a flip-flop 12 having a switching signal $G_C$ as an output signal. This switching signal $G_C$ turns on the charging switch C. As can be seen in FIG. 3 the flip-flop 12 is switched in a first switching condition outputting the switching signal $G_C$ if the time derivative $V_{DS\_der}$ of the node voltage becomes zero. This is detected by comparator 14. The node voltage $V_{DSC}$ on basis of which the time derivative $V_{DS\_der}$ is calculated is not directly measured in the system but a representing auxiliary voltage $V_{aux}$ is used as explained before. The time derivative $V_{DS\_der}$ of the node voltage is derived in a differentiator 15 on basis of the auxiliary voltage $V_{aux}$ and fed to the comparator 14. In this example the time derivative $V_{DS\_der}$ is derived on basis of $V_{aux}$. It has to be understood that it would be also possible to calculate the time derivative $V_{DS\_der}$ on basis of the differential voltage $V_{DS}$ across the charging switch or the reconstructed differential voltage $V_{DS\_div}$ across the charging switch C. The time derivative would be corresponding. The charging switch C is switched off by flip-flop 12 if a trigger signal $V_{tri\_C}$ reaches a regulator output signal $V_{err\_C}$. This can be seen also in the seventh graph in FIG. 2. The trigger signal $V_{tri\_C}$ is provided by an integrator 16. The regulator output signal $V_{err\_C}$ is provided by a PI-regulator 18 on basis of the output voltage $V_{out}$ which is compared with a reference value for the output voltage $V_{out\_ref}$.

The second control block 6 controls the releasing switch R. The releasing switch R is turned on and off by a flip-flop 20 outputting a switching signal $G_R$. The flip-flop 20 turns on the releasing switch R on basis of the output signal of a comparator 22 detecting if the node voltage $V_{DSC}$ reaches the output voltage $V_{out}$ as shown in the fourth graph in FIG. 2 (at point $t_2$). The comparator 22 does not directly use the node voltage $V_{DSC}$ as an input value, but the auxiliary voltage $V_{aux}$ measured across the auxiliary winding $W_{aux}$. The auxiliary voltage $V_{aux}$ is compared with a difference of the output voltage $V_{out}$ and the input voltage $V_{in}$.

The flip-flop 20 is switched in a second switching status switching off the releasing switch R on basis of a signal provided by a further comparator 24. The comparator 24 compares a trigger signal $V_{tri\_R}$ provided by an integrator 26 with a regulator output signal $V_{err\_R}$ provided by a PI-regulator 28. As can be seen in the eighth graph in FIG. 2 the releasing switch R is switched off when the trigger signal $V_{tri\_R}$ reaches the error signal $V_{err\_R}$.

The PI-regulator 28 together with the comparator 24, the integrator 26, a further flip-flop 30 and a further comparator 32 forms the third control block 8 controlling the extended time period te. The extended time period $t_e$ is essentially controlled by the PI-regulator 28. The PI-regulator 28 is part of a closed loop control for controlling a compensation control variable. In this example the compensation control variable is the auxiliary voltage $V_{aux}$ measured across the auxiliary winding $W_{aux}$. On basis of this compensation control variable a characteristic value is calculated. The characteristic value is the recalculated or reconstructed node voltage $V_{DS\_div}$ and is received by subtracting the negative representation of voltage $V_{in\_inv}$ from the instant auxiliary winding voltage $V_{aux}$ measured in the circuit. The reconstructed voltages ($V_{out}$-$V_{in}$ and $V_{in\_inv}$ respectively) are detected using two reconstruction voltage circuits 34 formed by a direct rectifier and a capacitor as shown in FIG. 3. The reconstructed node voltage $V_{DS\_div}$ is derived in subtraction means 36. The sampling block 10 comprises two sampling capacitors $C_{S\&H-1}$ and $C_{S\&H-2}$. These sampling capacitors $C_{S\&H-1}$ and $C_{S\&H-2}$ are used to store the detected characteristic value $V_{DSC\_div}$ (the reconstructed node voltage $V_{DSC\_div}$).

The reconstructed node voltage $V_{DSC\-div}$ is charged to the first sampling capacitor $C_{S\&H-1}$ when the releasing switch is turned on. For this a further flip flop 38 is used providing a sample turn on signal $SW_{S\&H-1}$ to switch on the first sampling capacitor $C_{S\&H-1}$ The sample turn on signal $SW_{S\&H-1}$ is output by flip-flop 38 if there is an output signal from comparator 22. The sample turn on signal $SW_{S\&H-1}$ is switched off by flip-flop 38 if there is an output signal from flip-flop 12, I. e. a switching signal $G_C$ turning on the charging switch C. The switching signal $G_C$ further serves as a sample turn signal $SW_{S\&H-2}$ for turning on the second sampling capacitor $C_{S\&H-2}$. This means in the instant when the charging switch C is turned on the reconstructed node voltage $_{VDSC\-div}$ is charged from the first sampling capacitor $C_{S\&H-1}$ to the second sampling capacitor $C_{S\&H-2}$. By this in the second sampling capacitor $C_{S\&H-2}$ a sample voltage $V_{sample}$ is stored representing a continues voltage waveform representing the switching node voltage under valley switching condition, I. e. representing the node voltage $V_{DSC}$ (corresponding to the voltage across the charging switch C) at the moment when turning on the charging switch C. In subtraction means 40 the sample voltage $V_{sample}$ is compared with a reference value $_{VDSC\-ref}$ which preferably is zero. The reference voltage $V_{DS\_ref}$ is the reference value of the switching node voltage in the instant of turning on the charging switch which should be achieved by the control. In the result the control block 8 controls the extended time $t_e$ of the switch on time of the releasing switch such that the node voltage $V_{DSC}$ is minimized, I. e. regulated to a reference value $V_{DS\_ref}$. By this the switching loss when turning on the charging switch C is minimized.

Figure 4:
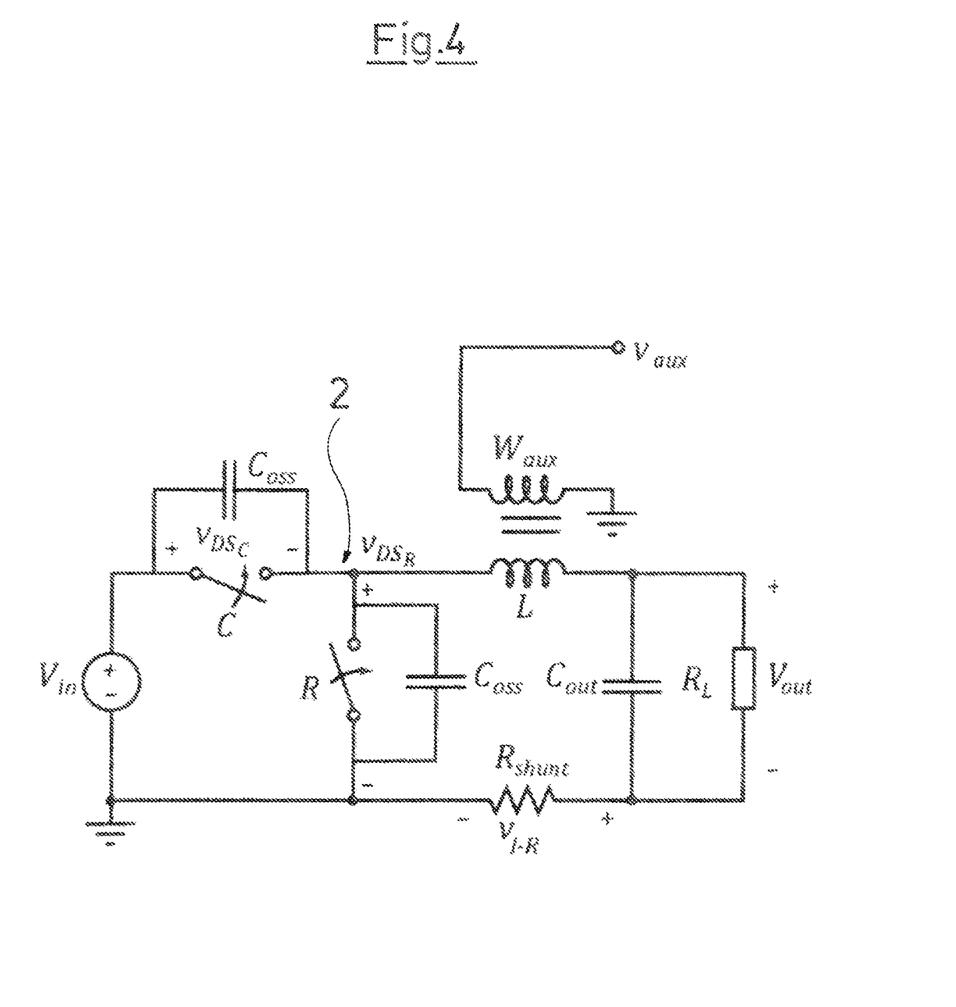
FIG. 4 is a schematic view of a power converter circuit according to a second embodiment of the invention.

The first example of the invention was described with reference to a boost converter as shown in FIG. 1. It has to be understood that the invention can be carried out in the same way with a buck converter as shown in FIG. 4. The control is carried out in the same way as described before, therefore, it is referred to the proceeding description of the control. In FIG. 4 the same reference signs are used. In the described example of a boost converter the node voltage at node 2 corresponds to the differential voltage across the charging switch C. In case of a buck converter the voltage across the charging switch C would not correspond to the node voltage. Thus, in case of a buck converter differing from the foregoing description the voltage across the charging switch $V_{DSC}$ has to be regarded instead of the node voltage. In the example according to FIG. 4 the node voltage would correspond to the voltage $V_{DSR}$ across the rectifier switch.

While specific embodiments of the invention have been shown and described in detail to illustrate the application of the principles of the invention, it will be understood that the invention may be embodied otherwise without departing from such principles.

The invention claimed is:

1. A control method for controlling a power converter circuit, the method comprising the steps of:
providing said power converter circuit comprising at least one inductive element storing an output energy, a charging switch for charging the inductive element, a releasing switch for releasing the stored output energy from the inductive element and for charging the inductive element with a compensation energy and an output capacitor saving the released output energy, wherein the compensation energy is used to achieve a minimized voltage switching condition when switching on the charging switch; and
adjusting a turn on time of the releasing switch by a closed-loop control of a compensation control variable measured in the power converter circuit or of a characteristic value derived from this compensation control variable, wherein the compensation control variable is derived on basis of a differential voltage detected across an auxiliary winding in the power converter circuit.

2. The control method according to claim 1, wherein the compensation energy stored in the inductive element has a reversed sign compared to the output energy stored in the inductive element.

3. The control method according to claim 1, wherein the closed-loop control adjusts the turn on time of the releasing switch to aim the compensation control variable or the derived characteristic value to reach a predefined value.

4. The control method according to claim 1, wherein a proportional-integral regulator is used in the closed loop control.

5. The control method according to claim 1, wherein the charging switch or the releasing switch or the charging switch and the releasing switch are turned on when a respective turn on variable reaches a predefined value.

6. The control method according to claim 5, wherein the turn on variable is a differential voltage across the respective switch or a time derivative of this differential voltage across the switch.

7. The control method according to claim 1, wherein the compensation control variable is a differential voltage across the charging switch in the power converter circuit or a variable representing such voltage.

8. The control method according to claim 1, wherein the auxiliary winding is magnetically coupled to a winding forming said inductive element in the power converter circuit.

9. The control method according to claim 1, wherein the compensation control variable is measured and stored at a certain point in time, in particular at the point in time when the charging switch is turned on, and the closed-loop control for adjusting the turn on time of the releasing switch is carried out on basis of the stored compensation variable.

10. The control method according to claim 1, wherein the turn on time of the releasing switch consists of a first time period from turning on the releasing switch until the current in the switch becomes zero and a second time period which is adjusted by said closed-loop control.

11. The control method according to claim 1, wherein a turn on time of the charging switch is closed-loop controlled to achieve a predefined output voltage of the output capacitor in the power converter circuit.

12. A power converter circuit comprising:
at least one inductive element storing an output energy;
a charging switch for charging the inductive element;
a releasing switch for releasing the stored output energy from the inductive element and for charging the inductive element with a compensation energy;
an output capacitor saving the released output energy;
a control means for controlling the charging switch and the releasing switch; and
a measuring means for measuring a compensation control variable in said power converter circuit, wherein said control means comprises a closed-loop controller controlling the compensation control variable or a characteristic value derived from this compensation control variable to adjust a turn on time of the releasing switch and said measuring means comprises an auxiliary winding, wherein the measuring means is configured to measure a differential voltage across the auxiliary winding and the control means closed-loop controller is configured to carry out the closed loop control to adjust the turn on time of the releasing switch on a basis of the measured differential voltage across the auxiliary winding or on a basis of a characteristic value derived from this differential voltage.

13. The power converter circuit according to claim 12, wherein the power converter circuit is a boost converter or a buck converter.

14. The power converter circuit according to claim 12, wherein said auxiliary winding is magnetically coupled to a winding of said inductive element.

15. The power converter circuit according to claim 12, wherein the control means further comprises storage means for storing the differential voltage measured across the auxiliary winding or the characteristic value derived from said differential voltage, said storage means comprising at least one capacitor.

16. The power converter circuit according to claim 15, wherein an output of said storage means is connected to an input of said closed-loop controller.

17. The power converter circuit according to claim 12, wherein the closed-loop controller comprises a proportional-integral regulator.

18. A power converter circuit comprising:
at least one inductive element storing an output energy;
a charging switch for charging the inductive element;
a releasing switch for releasing the stored output energy from the inductive element and for charging the inductive element with a compensation energy;
an output capacitor saving the released output energy;
a measuring means for measuring a differential voltage across the charging switch in the power converter circuit or for measuring a variable representing said differential voltage across the charging switch in the power converter circuit as a compensation control variable, said measuring means comprising an auxiliary winding, wherein the measuring means is configured to measure a differential voltage across the auxiliary winding as the variable voltage representing the differential voltage across the charging switch; and a control means for controlling the charging switch and the releasing switch, said control means comprising a closed-loop controller configured to carry out a closed loop control to adjust the turn on time of the releasing switch based on the measured differential voltage across the auxiliary winding or based on a characteristic value derived from the differential voltage across the auxiliary winding.

19. The power converter circuit according to claim 18, wherein said auxiliary winding is magnetically coupled to a winding of said inductive element in the power converter circuit, wherein the differential voltage across the inductive element represents the differential voltage across the charging switch.

20. The power converter circuit according to claim 18, wherein the control means further comprises storage means for storing the differential voltage measured across the auxiliary winding or the characteristic value derived from said differential voltage, said storage means comprising at least one capacitor.

* * * * *